Dec. 29, 1936.　　　G. A. ELLESTAD　　　2,065,671

OPHTHALMIC MOUNTING

Filed Feb. 7, 1936

Gerhard A. Ellestad
INVENTOR

BY

ATTORNEY

Patented Dec. 29, 1936

2,065,671

UNITED STATES PATENT OFFICE 2,065,671

OPHTHALMIC MOUNTING

Gerhard A. Ellestad, Rochester, N. Y., assignor to Bausch & Lomb Optical Company, Rochester, N. Y., a corporation of New York Application February 7, 1936, Serial No. 62,806

9 Claims. (Cl. 88—53)

This invention relates to ophthalmic mountings and more particularly it has reference to devices for holding together parts of ophthalmic mountings which are in contact with each other such as the lugs on the ends of a split lens rim, for example.

One of the objects of my invention is to provide improved means for securing together parts of an ophthalmic mounting. Another object is to provide means whereby the ends of a split lens rim may be held together in a simple, yet efficient, manner. A further object is to provide means for holding together the ends of a split lens rim without the use of screws. Still another object is to provide a device of the character described which will be neat in appearance and capable of being readily assembled. Further objects and advantages reside in certain novel features of construction, arrangement and combination of parts as will hereinafter be more fully described and pointed out in the appended claims.

Referring to the drawing.

Figure 1:
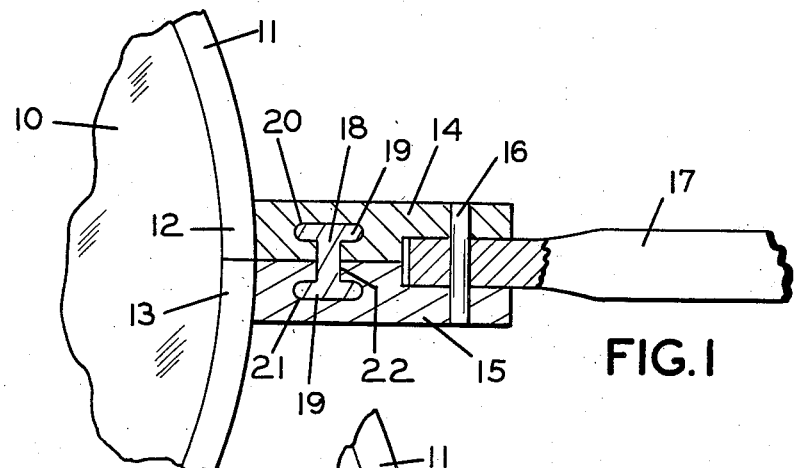
Fig. 1 is a fragmentary view, with parts in section, of an ophthalmic mounting embodying the invention.
Figure 2:
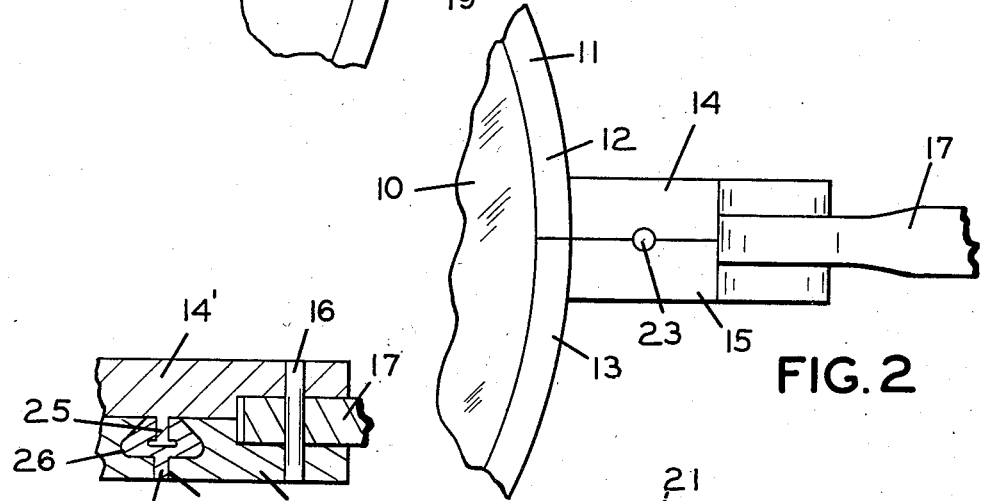
Fig. 2 is a side elevation thereof.

A preferred embodiment of my invention is illustrated in the drawing wherein 10 indicates a lens which is held in a spectacle frame having a lens rim 11 which is split to provide the two adjacent ends 12 and 13. Secured to the upper end 12, as by hard soldering, for example, is the lug 14 while lug 15 is similarly secured to the lens rim end 13. The two lugs carry the usual dowel pin 16 on which is pivotally mounted the temple 17 in the usual manner.

With the lens 10 in position the two lugs are held together in a substantial face-to-face contact by means of a fusible retaining element 18 having the enlarged head portions 19 which are anchored, respectively, in the recesses 20 and 21 formed on the inner faces of lugs 14 and 15. As clearly shown in Fig. 1, the recesses 20 and 21 have narrow mouth portions so that when the recesses and connecting neck portions 22 are filled with an integral mass of fusible material 18 the two lugs will be held together. The fusible material 18 may be introduced through the aperture 23 which may be formed by providing cooperating grooves 24 on the inner face of each lug.

The retaining element 18 is made of a fusible material which has a relatively low melting point so that it may be softened or melted by application of heat which will not, however, be sufficient to damage the lens or the mounting. Such material may be either a non-metallic plastic substance or a metallic alloy having a sufficiently low melting point.

In assembling the mounting, the associated parts would be held together and, while so held, would be heated electrically, or otherwise. The material, in the form of a wire or rod, would then be introduced through opening 23 and would melt and fill in the recesses, connecting neck and the grooves 24. Upon cooling, the lugs will be held together by the element 18 having integral head portions molded in situ. To take the mounting apart it is only necessary to again apply sufficient heat to melt the fusible element 18.

Figure 4:
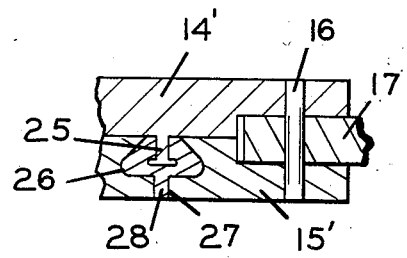
Figs. 4 and 5 are views of modifications.
Figure 3:
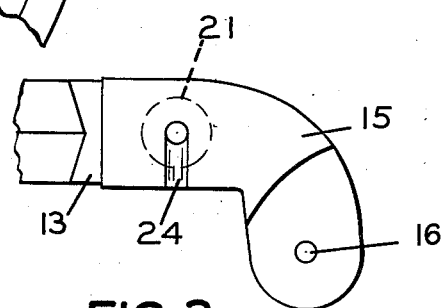
Fig. 3 is a top plan view of the lower lug of the endpiece.
Figure 5:
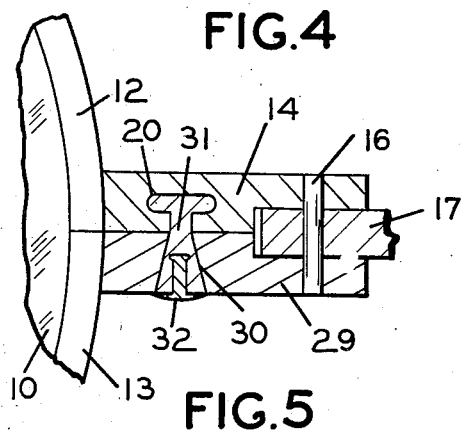

In Fig. 4 there is shown a modification comprising the two lugs 14' and 15'. In this structure the lug 14' has a headed projection 25 which extends into a recess 26 formed in lug 15'. An aperture 27 affords means for introducing the fusible material 28 and the shape of the recess 26 is such that the material is anchored therein while the headed projection 25 affords anchoring means for the material on lug 15'. A further modification, shown in Fig. 5, has an upper lug 14 having a recess 20 such as shown in Fig. 1. The lower cooperating lug 29, however, has a tapered aperture 30 opposite recess 20. The fusible material 31 is introduced through the aperture 30 and a headed metal plug 32 may be inserted in the material 31 while the latter is in a soft or molten condition. The head of plug 32 would have the same finish as the outer surfaces of the mounting so that the plug 32 would conceal the material 31 and hence afford a neat appearing article.

From the foregoing, it will be apparent that I am able to attain the objects of my invention and provide an improved means for connecting parts of an ophthalmic mounting. The fusible material and the method of molding, in situ, a rivet-like retaining element is not to be confused with soldering, since the latter requires the use of a flux while the molding operation does not. Since my structure does not employ screws, the disadvantage and annoyance occasioned by loose screws is avoided. My structure can be readily assembled or taken apart upon the application of a reasonable amount of heat so that the lens and mounting are not damaged. Although I have shown the application of my invention to the split endpiece of a spectacle frame, it is obvious that it may be applied with equal success for joining other contacting or adjacent parts of an ophthalmic mounting. Various other modifications can obviously be made without departing from the spirit of my invention.

I claim:

1. An ophthalmic mounting comprising a split lens rim having adjacent ends, a lug secured to each end, each lug having on its inner face a recess with its mouth narrower than another part of the recess, said lugs being in contact so that the recesses are in communication with each other, and an integral mass of fusible material filling said recesses.

2. An ophthalmic mounting comprising a split lens rim having adjacent ends, a lug secured to each end, each lug having anchoring means, said lugs being in contact so that the respective anchoring means are in communication with each other and fusible retaining means secured to the anchoring means on each lug whereby said ends are held together.

3. An ophthalmic mounting comprising a split lens rim having adjacent ends, a lug secured to each of said ends, each lug having a re-entrant recess on its inner face, said recesses being in communication with each other, and an integral mass of fusible material filling said recesses.

4. An ophthalmic mounting comprising a split lens rim having adjacent ends, a lug secured to each of said ends, said lugs being adapted to be placed in face-to-face contact for holding said ends together, anchoring means formed on the inner face of each lug in alignment with each other and an integral body of fusible material molded to the anchoring means on each lug whereby said ends are held together.

5. An ophthalmic mounting comprising a split lens rim having adjacent ends, a lug secured to each end, anchoring means on each lug, said lugs being in contact with each other so that the respective anchoring means are in communication with each other, and an integral mass of fusible material molded to the anchoring means on each lug, one of said lugs having an aperture in communication with its anchoring means whereby the fusible material is introduced.

6. An ophthalmic mounting having in combination two parts carried by a lens, said parts being in face-to-face contact with each other, anchoring means on the inner face of each part, the respective anchoring means being in cooperative communication with each other, and an integral body of fusible material molded to the respective anchoring means, one of said parts having an aperture in communication with its anchoring means whereby said fusible material is introduced.

7. An ophthalmic mounting comprising a split lens rim having adjacent ends, a lug carried by each end, each lug having anchoring means, the anchoring means on one lug comprising a recess having a mouth which is narrower than another part of the recess, said lugs being in contact so that the respective anchoring means are in communication with each other, and an integral mass of fusible material molded to and connecting the anchoring means whereby said lugs will be held together.

8. An ophthalmic mounting comprising a split lens rim having adjacent ends, a lug carried by each end, the lugs being held together by an integral body of fusible material, said body comprising two enlarged head portions connected by a neck, anchoring means on each of said lugs, each of said head portions being held by cooperative engagement with the respective anchoring means, said lugs having an opening leading to said anchoring means whereby said fusible material is introduced.

9. An ophthalmic mounting comprising a split lens rim having adjacent ends, a lug carried by each end, each lug having anchoring means, said lugs being positioned with their inner faces in juxta-position and with the anchoring means on both lugs in communication with each other, an integral mass of fusible material molded to and connecting the respective anchoring means whereby said lugs are held together, said lugs having an opening leading to the anchoring means whereby said fusible material is introduced.

GERHARD A. ELLESTAD.